United States Patent
Villacres Mesias et al.

(10) Patent No.: US 12,030,417 B2
(45) Date of Patent: Jul. 9, 2024

(54) CUP HOLDER ASSEMBLY

(71) Applicant: Ford Global Technologies, LLC, Dearborn, MI (US)

(72) Inventors: Diego F. Villacres Mesias, Mexico City (MX); Gustavo Llamas Maldonado, Mexico City (MX); Jose Carlos Hernandez, Mexico City (MX); Matthew J. Hickey, Canton, MI (US); Michele M. Mathews, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/931,950

(22) Filed: Sep. 14, 2022

(65) Prior Publication Data
US 2024/0083327 A1 Mar. 14, 2024

(51) Int. Cl.
*B60N 3/10* (2006.01)
*A47G 23/02* (2006.01)

(52) U.S. Cl.
CPC ......... *B60N 3/108* (2013.01); *A47G 23/0208* (2013.01)

(58) Field of Classification Search
CPC .............................. B60N 3/108; A47G 23/0208
USPC ...................................................... 248/311.2
See application file for complete search history.

(56) References Cited

U.S. PATENT DOCUMENTS

| | | | |
|---|---|---|---|
| 978,734 A | 12/1910 | Gordon | |
| 1,622,971 A | 3/1927 | Porter | |
| 2,121,440 A | 6/1938 | Morrison | |
| 2,787,435 A | 4/1957 | Shields | |
| 5,507,460 A | 4/1996 | Schneider | |
| 5,624,094 A | 4/1997 | Protz, Jr. | |
| 5,639,140 A | 6/1997 | Labrash | |
| 5,664,304 A | 9/1997 | Tambornino | |
| 5,769,294 A | 6/1998 | Heinz et al. | |
| 5,984,250 A | 11/1999 | Connor | |
| 7,487,945 B2 | 2/2009 | Lin et al. | |
| 7,520,482 B2 | 4/2009 | Shin | |
| 7,837,248 B2 | 11/2010 | Nedelman | |
| 8,113,477 B2 * | 2/2012 | Kaemmer | B60N 3/106 248/314 |

(Continued)

FOREIGN PATENT DOCUMENTS

| | | |
|---|---|---|
| DE | 102013100661 A1 | 7/2014 |
| EP | 2329992 A2 | 6/2011 |

(Continued)

*Primary Examiner* — Anita M King
(74) *Attorney, Agent, or Firm* — Vichit Chea; Price Heneveld (57) ABSTRACT

A cup holder assembly includes a body that defines a cup-receiving cavity and an aperture that extends through a side wall of the body, a first bracing feature and a second bracing feature, each of which is coupled to the body and positioned outside of the cup-receiving cavity, and a retention finger. The retention finger includes a first portion that extends into the cup-receiving cavity through the aperture, a first engagement feature coupled to the first portion and pivotably engaged with the first bracing feature, and a second engagement feature coupled to the first portion and engaged with the second bracing feature. The retention finger is operable to move via pivotal movement of the first engagement feature relative to the first bracing feature.

19 Claims, 7 Drawing Sheets

(56) References Cited

U.S. PATENT DOCUMENTS

| | | | |
|---|---|---|---|
| 8,439,438 B2 * | 5/2013 | Oldani | B60N 3/102 |
| | | | 297/188.14 |
| 8,480,690 B2 | 7/2013 | Vijayanagar | |
| 8,733,724 B2 | 5/2014 | Voigt et al. | |
| 8,763,216 B2 | 7/2014 | Codega | |
| 8,973,961 B1 | 3/2015 | Setsuda et al. | |
| 9,561,745 B2 * | 2/2017 | Sawada | B60N 3/101 |
| 9,695,975 B2 | 7/2017 | Ogawa | |
| 9,797,432 B2 | 10/2017 | Inkavesvaanit | |
| 9,834,122 B2 | 12/2017 | Vaupotic et al. | |
| 10,086,736 B1 * | 10/2018 | Jacobsen | B60N 3/106 |
| 10,814,771 B2 | 10/2020 | Villacres Mesias et al. | |
| 2004/0084918 A1 | 5/2004 | Brandt et al. | |
| 2005/0193531 A1 | 9/2005 | Chang | |
| 2005/0244242 A1 | 11/2005 | Johnson | |
| 2006/0103186 A1 | 5/2006 | Sturt et al. | |
| 2007/0183860 A1 | 8/2007 | Smith | |
| 2009/0183347 A1 | 7/2009 | Abels | |
| 2011/0113604 A1 | 5/2011 | Chu | |
| 2017/0129412 A1 | 5/2017 | Lewis et al. | |
| 2018/0251059 A1 * | 9/2018 | Cociuba | B60N 3/108 |

FOREIGN PATENT DOCUMENTS

| | | | |
|---|---|---|---|
| EP | 2062783 B1 | 3/2014 | |
| EP | 2604870 B1 | 5/2016 | |
| FR | 3077248 B1 | 2/2020 | |
| FR | 3077247 B1 | 6/2020 | |
| KR | 20060057906 A | 5/2006 | |
| KR | 20090049217 A | 5/2009 | |
| KR | 101807415 B1 | 12/2017 | |

* cited by examiner

CUP HOLDER ASSEMBLY

FIELD OF THE DISCLOSURE

The present invention generally relates to a cup holder assembly. More specifically, the present invention relates to a cup holder assembly that includes a retention finger.

BACKGROUND OF THE DISCLOSURE

Cup holder assemblies can include retention features that aid in securely holding a cup within the cup holder.

SUMMARY OF THE DISCLOSURE

According to one aspect of the present invention, a cup holder assembly includes a body that defines a cup-receiving cavity and an aperture that extends through a side wall of the body, a first bracing feature coupled to the body and positioned outside of the cup-receiving cavity, a second bracing feature coupled to the body and positioned outside of the cup-receiving cavity, and a retention finger. The retention finger includes a first portion that extends into the cup-receiving cavity through the aperture, a first engagement feature coupled to the first portion and pivotably engaged with the first bracing feature, and a second engagement feature coupled to the first portion and engaged with the second bracing feature. The retention finger is operable to move via pivotal movement of the first engagement feature relative to the first bracing feature between a first position and a second position. In the first position, the first portion extends into the cup-receiving cavity a first distance and the second engagement feature is elastically deformed a first amount due to contact with the second bracing feature. In the second position, the first portion extends into the cup-receiving cavity a second distance that is less than the first distance and the second engagement feature is elastically deformed a second amount that is greater than the first amount due to contact with the second bracing feature.

Embodiments of the first aspect of the invention can include any one or a combination of the following features:
- the first bracing feature defines a first arcuate receiving space, and the second bracing feature defines a second arcuate receiving space, wherein the second arcuate receiving space is nearer than the first arcuate receiving space to the aperture that extends through the side wall of the body;
- the first engagement feature includes a first arm coupled to the first portion and extending away from the first portion, and a first rod extending outward from the first arm along a length of the first rod in a first direction;
- the second engagement feature includes a second arm coupled to the first portion and extending away from the first portion, and a second rod extending outward from the second arm along a length of the second rod in a second direction that is substantially parallel to the first direction, such that the lengths of the first and second rods are substantially parallel to each other;
- the second rod is nearer than the first rod to the first portion of the retention finger;
- the first rod is received within the first arcuate receiving space defined by the first bracing feature, and the second rod is received within the second arcuate receiving space defined by the second bracing feature;
- the first and second bracing features are integrally coupled with the body;
- at least one of the first bracing feature and the second bracing feature is integrally coupled with a bracket that is removably coupled to the body;
- the first portion, the first engagement feature, and the second engagement feature are integrally coupled; and
- in the second position of the retention finger, the retention finger is biased towards the first position due to the elastic deformation of the second engagement feature.

According to a second aspect of the present invention, a cup holder assembly includes a body that defines a cup-receiving cavity and an aperture that extends through a side wall of the body, a first bracing feature coupled to the body, positioned outside of the cup-receiving cavity, and defining a first arcuate receiving space, a second bracing feature coupled to the body, positioned outside of the cup-receiving cavity, and defining a second arcuate receiving space, and a retention finger. The retention finger includes a first portion that extends into the cup-receiving cavity through the aperture, a first engagement feature, and a second engagement feature. The first engagement feature includes a first arm coupled to the first portion and a first rod extending outward from the first arm along a length of the first rod in a first direction. The first rod is received within the first arcuate receiving space defined by the first bracing feature, such that the first engagement feature is pivotably engaged with the first bracing feature. The second engagement feature includes a second arm coupled to the first portion and a second rod extending outward from the second arm along a length of the second rod in a second direction that is substantially parallel to the first direction, such that the lengths of the first and second rods are substantially parallel to each other. The second rod is received within the second arcuate receiving space defined by the second bracing feature, such that the second rod is engaged with the second bracing feature. The retention finger is operable to move via pivotal movement of the first engagement feature relative to the first bracing feature between a first position and a second position. In the first position, the first portion extends into the cup-receiving cavity a first distance and the second engagement feature is elastically deformed a first amount due to contact between the second rod and the second bracing feature. In the second position, the first portion extends into the cup-receiving cavity a second distance that is less than the first distance and the second engagement feature is elastically deformed a second amount that is greater than the first amount due to contact between the second rod and the second bracing feature.

Embodiments of the second aspect of the invention can include any one or a combination of the following features:
- the second arcuate receiving space is nearer than the first arcuate receiving space to the aperture that extends through the side wall of the body;
- the second rod is nearer than the first rod to the first portion of the retention finger;
- the first and second bracing features are integrally coupled with the body;
- at least one of the first bracing feature and the second bracing feature is integrally coupled with a bracket that is removably coupled to the body; and
- the first portion, the first engagement feature, and the second engagement feature are integrally coupled.

According to a third aspect of the present invention, a cup holder assembly includes a body that defines a cup-receiving cavity and an aperture that extends through a side wall of the body, and a retention finger operable to pivot about a pivot axis that is wholly outside of the cup-receiving cavity between a first position and a second position. In the first position, the retention finger extends into the cup-receiving cavity a first distance and is elastically deformed a first amount. In the second position, the retention finger extends into the cup-receiving cavity a second distance that is less than the first distance and the retention finger is elastically deformed a second amount that is greater than the first amount.

Embodiments of the third aspect of the invention can include any one or a combination of the following features:
- in the second position of the retention finger, the elastic deformation of the retention finger biases the retention finger toward the first position;
- in the first position of the retention finger, the elastic deformation of the retention finger biases the retention finger away from the second position; and
- the retention finger includes a first portion that extends into the cup-receiving cavity through the aperture, a first engagement feature coupled to the first portion and pivotably engaged with a first bracing feature, and a second engagement feature coupled to the first portion and engaged with a second bracing feature.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-11, a cup holder assembly 10 includes a body 12. The body 12 defines a cup-receiving cavity 14 and an aperture 16 that extends through a side wall 18 of the body 12. A first bracing feature 20 is coupled to the body 12 and positioned outside of the cup-receiving cavity 14. The first bracing feature 20 defines a first arcuate receiving space 22. A second bracing feature 24 is coupled to the body 12 and positioned outside of the cup-receiving cavity 14. The second bracing feature 24 defines a second arcuate receiving space 26. A retention finger 28 includes a first portion 30, a first engagement feature 32, and a second engagement feature 34. The first portion 30 extends into the cup-receiving cavity 14 through the aperture 16. The first engagement feature 32 includes a first arm 36 that is coupled to the first portion 30 and a first rod 38 that extends outward from the first arm 36 along a length of the first rod 38 in a first direction. The first rod 38 is received within the first arcuate receiving space 22 defined by the first bracing feature 20 such that the first engagement feature 32 is pivotably engaged with the first bracing feature 20. The second engagement feature 34 includes a second arm 40 that is coupled to the first portion 30 and a second rod 42 that extends outward from the second arm 40 along a length of the second rod 42 in a second direction. The second direction is substantially parallel to the first direction, such that the lengths of the first and second rods 38, 42 are substantially parallel to each other. The second rod 42 is received within the second arcuate receiving space 26 that is defined by the second bracing feature 24 such that the second rod 42 is engaged with the second bracing feature 24. The retention finger 28 is operable to move via pivotal movement of the first engagement feature 32 relative to the first bracing feature 20 between a first position and a second position. In the first position, the first portion 30 extends into the cup-receiving cavity 14 a first distance and the second engagement feature 34 is elastically deformed a first amount due to contact between the second rod 42 and the second bracing feature 24. In the second position, the first portion 30 extends into the cup-receiving cavity 14 a second distance that is less than the first distance, and the second engagement feature 34 is elastically deformed a second amount that is greater than the first amount due to contact between the second rod 42 and the second bracing feature 24.

Figure 1:
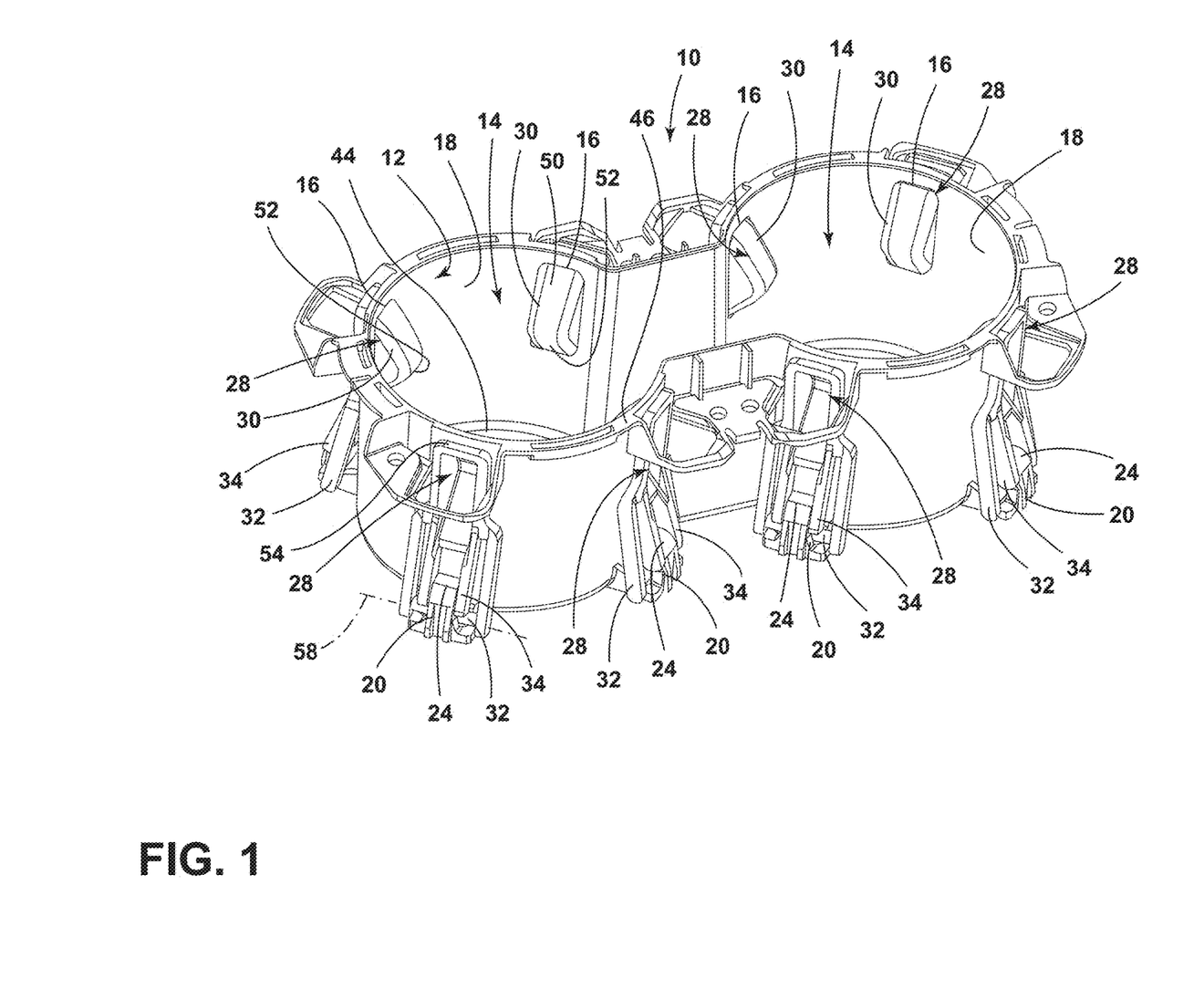
FIG. 1 is a top perspective view of a cup holder assembly that includes a plurality of retention fingers, according to one embodiment.
Figure 2:
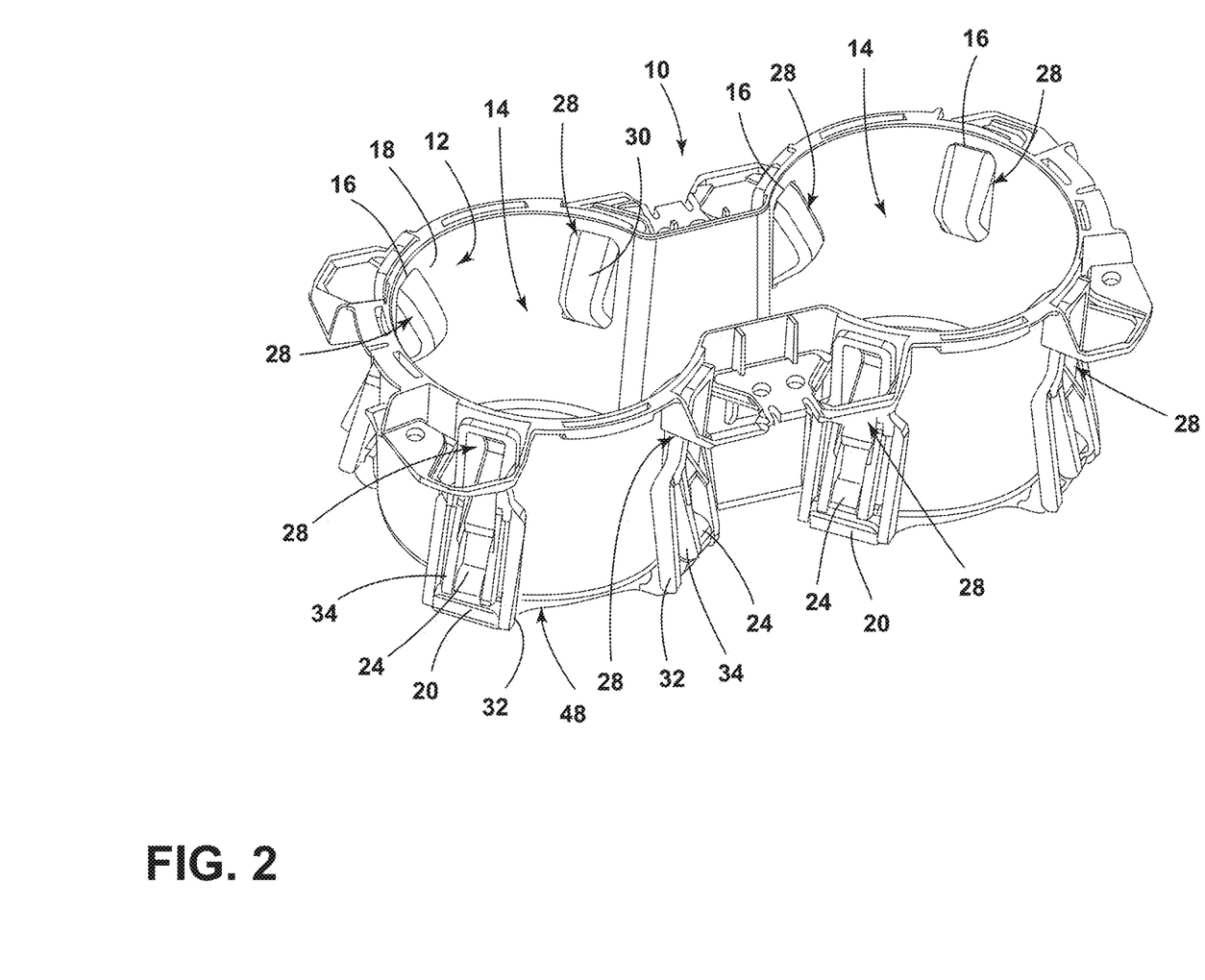
FIG. 2 is a top perspective view of a cup holder assembly that includes a body, a base bracket, and a plurality of retention fingers, according to one embodiment.

Referring now to FIGS. 1 and 2, the cup holder assembly 10 includes the body 12. The body 12 defines the cup-receiving cavity 14. In some implementations, the body 12 defines a plurality of cup-receiving cavities 14. For example, as illustrated in FIGS. 1 and 2, the body 12 of the cup holder assembly 10 defines two cup-receiving cavities 14. The body 12 of the cup holder assembly 10 can include a floor 44 and the side wall 18 that extends upward from the floor 44 to an upper rim 46 of the body 12. The body 12 defines the aperture 16 that extends through the side wall 18 of the body 12. As illustrated in FIGS. 1 and 2, in various implementations, the side wall 18 of the body 12 defines a plurality of apertures 16.

Figure 3:
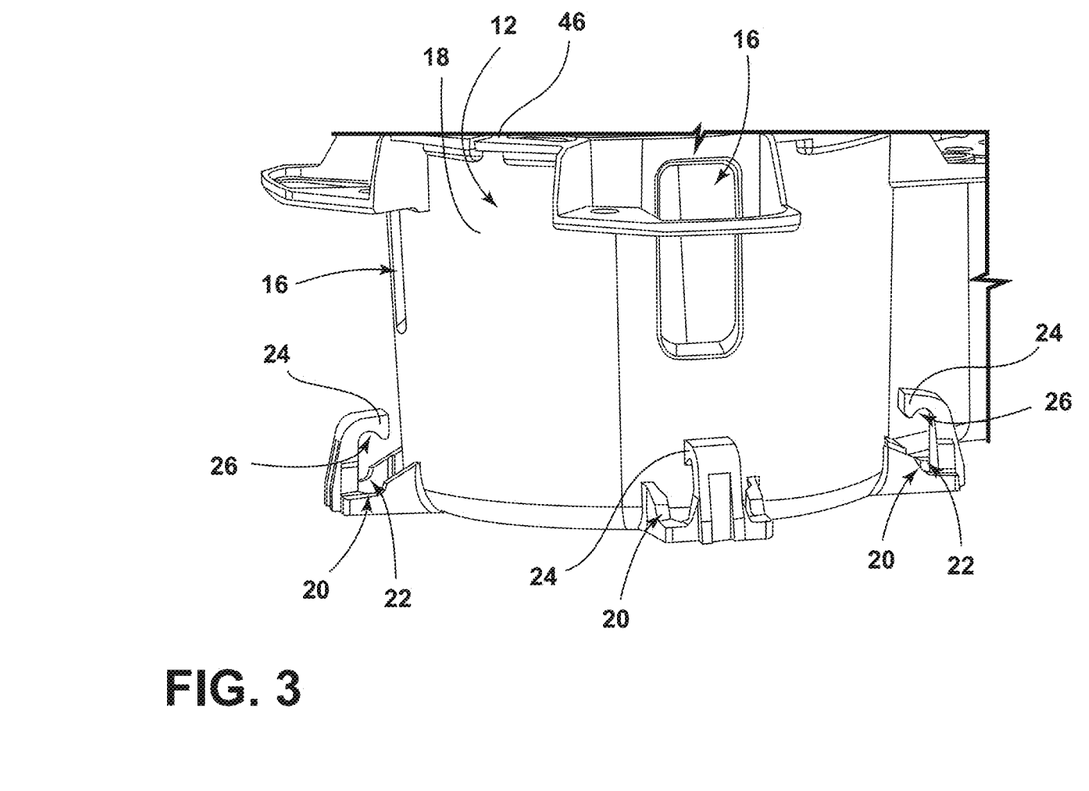
FIG. 3 is a side elevational view of a portion of a cup holder assembly that includes the body, a first bracing feature, and a second bracing feature, according to one embodiment.
Figure 4:
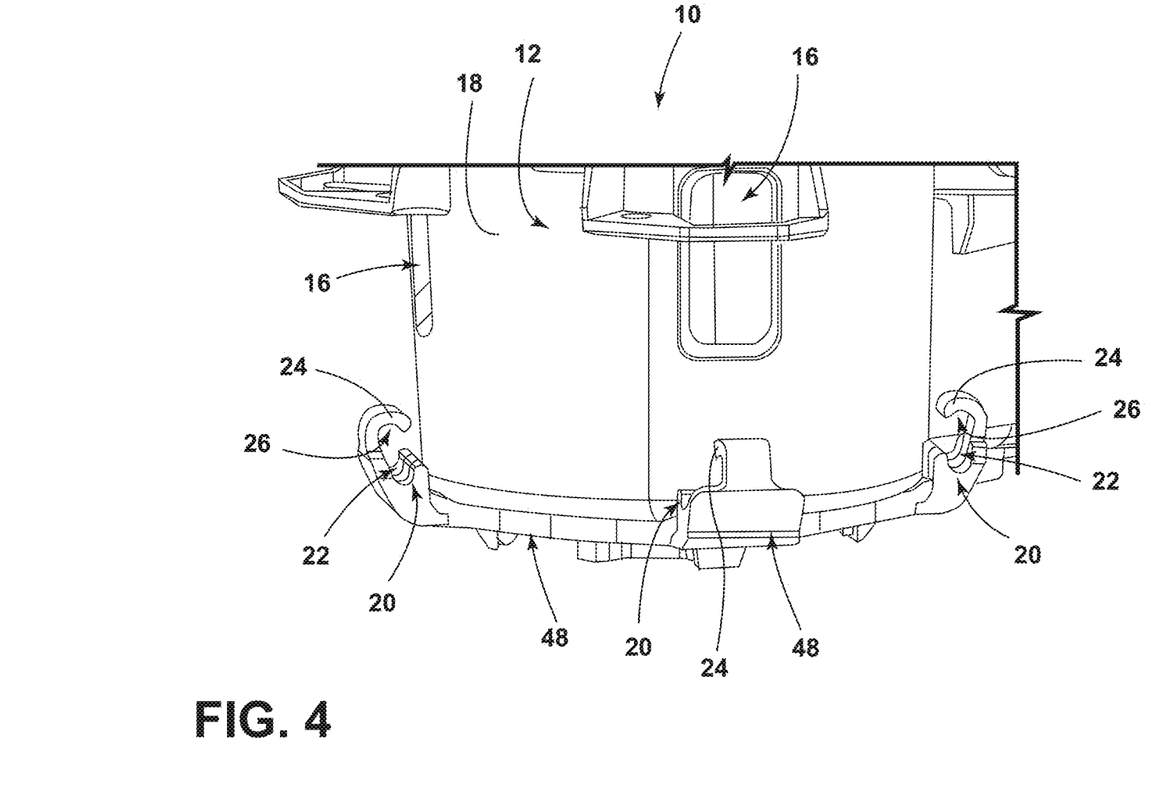
FIG. 4 is a side elevational view of a portion of a cup holder assembly that includes a body and a base bracket having a first bracing feature and a second bracing feature, according to one embodiment.
Figure 5:
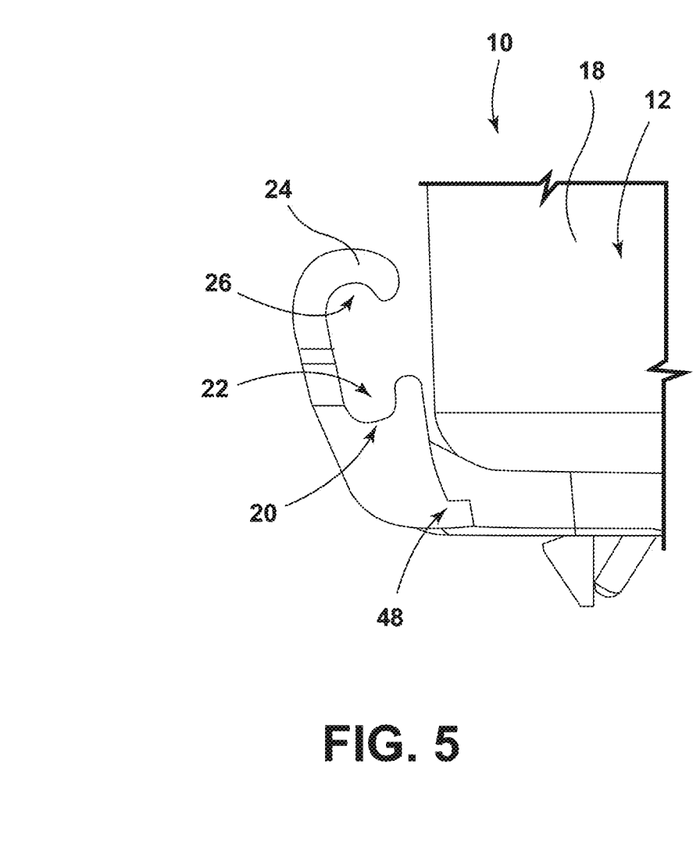
FIG. 5 is a side elevational view of a portion of the cup holder assembly, illustrating the first and second bracing features of the base bracket, according to one embodiment.

Referring now to FIGS. 3-6, the cup holder assembly 10 includes the first bracing feature 20 and the second bracing feature 24. The first bracing feature 20 is coupled to the body 12 and is positioned outside of the cup-receiving cavity 14. The second bracing feature 24 is coupled to the body 12 and positioned outside of the cup-receiving cavity 14. As illustrated in FIGS. 3-6, in some implementations, the first bracing feature 20 defines the first arcuate receiving space 22, and the second bracing feature 24 defines the second arcuate receiving space 26. In various embodiments, the first and/or second arcuate receiving spaces 22, 26 have substantially semicircular profiles, as illustrated in FIG. 5. The substantially semicircular profiles of the first and/or second arcuate receiving spaces 22, 26 can advantageously retain the retention finger 28 while allowing for pivotal movement of the retention finger 28, as described further herein. As illustrated in FIGS. 3 and 4, the second arcuate receiving space 26 is nearer than the first arcuate receiving space 22 to the aperture 16 that extends through the side wall 18 of the body 12.

Figure 6:
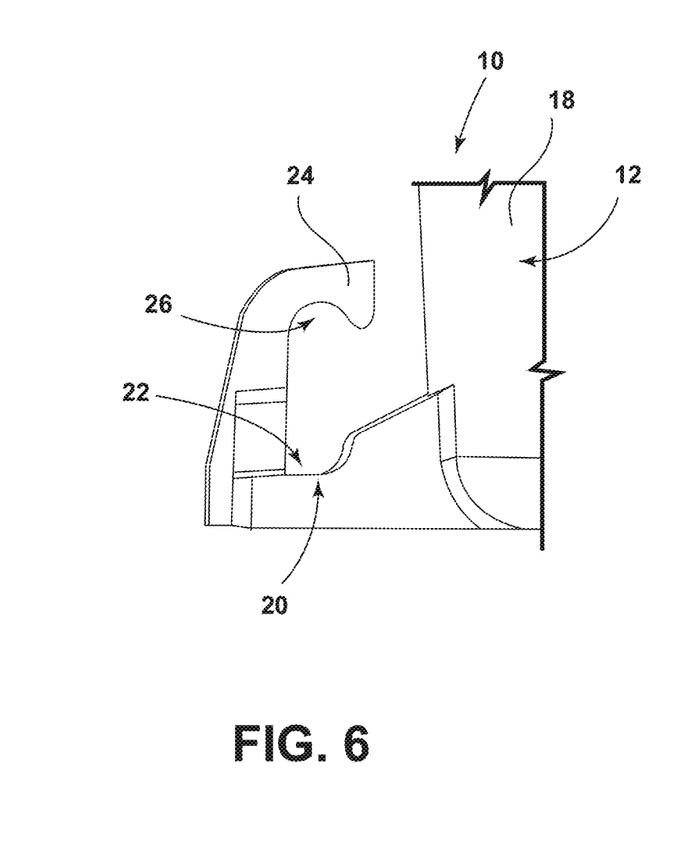
FIG. 6 is a side elevational view of a portion of the cup holder assembly, illustrating first and second bracing features integrally coupled with the body of the cup holder assembly, according to one embodiment.

Referring still to FIGS. 3-6, in some implementations, the first and second bracing features 20, 24 are integrally coupled with the body 12 of the cup holder assembly 10. For example, as illustrated in FIGS. 3 and 6, the first bracing feature 20, the second bracing feature 24, and the body 12 of the cup holder assembly 10 are a single unitary structure. In the illustrated embodiment, the first bracing feature 20 extends outward from the body 12 and the second bracing feature 24 is connected to the first bracing feature 20. As illustrated in FIG. 5, in various implementations, the first and second arcuate receiving spaces 22, 26 face toward each other.

Referring now to FIGS. 4 and 5, in some implementations, the cup holder assembly 10 includes a bracket 48. The bracket 48 may be removably coupled to the body 12. In other words, the bracket 48 may be assembled and disassembled from the body 12 as a distinct component of the cup holder assembly 10. As illustrated in FIGS. 4 and 5, the bracket 48 may extend beneath the floor 44 of the body 12 and may be coupled thereto. The bracket 48 can include the first and/or second bracing features 20, 24 of the cup holder assembly 10. In various embodiments, the first bracing feature 20 and/or the second bracing feature 24 may be integrally coupled with the bracket 48 that is removably coupled to the body 12. In the embodiment illustrated in FIGS. 4 and 5, the bracket 48 includes the first bracing feature 20 and the second bracing feature 24, which are positioned along the side wall 18 of the body 12 wholly outside of the cup-receiving cavity 14 defined by the body 12.

Referring now to FIGS. 5 and 6, the shortest distance between the side wall 18 of the body 12 and the second bracing feature 24 may be a distance that is less than or equal to a diameter of the first and/or second rods 38, 42 of the first and second engagement features 32, 34, respectively. The spacing between the side wall 18 of the body 12 and the second bracing feature 24 may advantageously allow for insertion of the first and second rods 38, 42 into the first and second arcuate receiving spaces 22, 26, while guarding against unintentional disengagement of the first and second engagement features 32, 34. In various embodiments, the first and/or second bracing features 20, 24 may elastically deform to allow for assembly of the retention finger 28 with the first and second bracing features 20, 24.

Referring now to FIGS. 1, 2, 7, and 8, the cup holder assembly 10 includes the retention finger 28. In various implementations, the cup holder assembly 10 includes a plurality of retention fingers 28. For example, as illustrated in FIGS. 1 and 2, the cup holder assembly 10 includes eight retention fingers 28. The retention finger 28 includes the first portion 30. The first portion 30 is configured to extend into the cup-receiving cavity 14 through the aperture 16 defined by the body 12 of the cup holder assembly 10, as illustrated in FIGS. 1 and 2. In various implementations, the first portion 30 of the retention finger 28 is configured to contact a cup that is inserted into the cup-receiving cavity 14 and apply pressure to the cup to securely hold the cup within the cup-receiving cavity 14. In the embodiments illustrated in FIGS. 1, 2, 7, and 8, the first portion 30 includes a contoured contact surface 50 that forms a corner portion 52. The corner portion 52 of the first portion 30 of the retention finger 28 protrudes into the cup-receiving cavity 14 further than the other portions of the first portion 30. It is contemplated that the first portion 30 can be a variety of shapes, in various embodiments. As illustrated in FIGS. 1, 2, 7, and 8, a retention rim 54 extends outward from the first portion 30 along at least a portion of a periphery of the first portion 30. As illustrated in FIGS. 1 and 2, the retention rim 54 is configured to contact the side wall 18 of the body 12 adjacent to the aperture 16 that extends through the side wall 18 of the body 12. As such, the first portion 30 protrudes through the aperture 16 defined by the side wall 18 of the body 12, and the retention rim 54 of the retention finger 28 abuts the side wall 18 such that travel of the first portion 30 of the retention finger 28 into the cup-receiving cavity 14 is limited.

Figure 7:
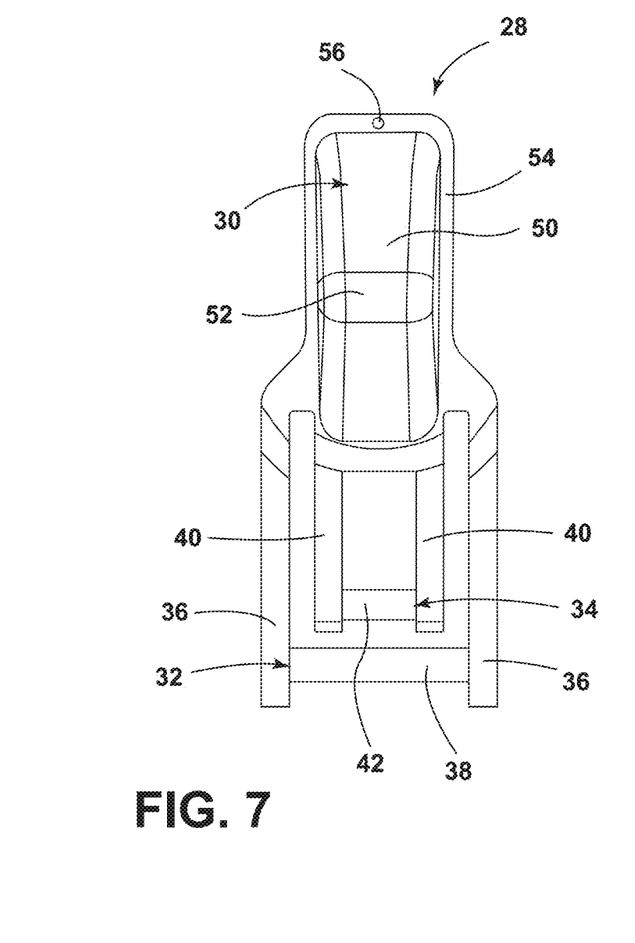
FIG. 7 is a front elevational view of the retention finger, illustrating a first portion, a first engagement feature, and a second engagement feature, according to one embodiment.

Referring now to FIG. 7, a protrusion 56 can extend outward from the retention rim 54 of the retention finger 28. As illustrated in FIG. 7, the protrusion 56 extends outward toward the side wall 18 of the body 12 from a portion of the retention rim 54 that is positioned above the first portion 30 of the retention finger 28. In the illustrated embodiment, the protrusion 56 is semi-spherical. The protrusion 56 is configured to provide punctual contact with the body 12 of the cup holder assembly 10 in order to reduce or prevent rattling between the body 12 and the retention finger 28.

Figure 8:
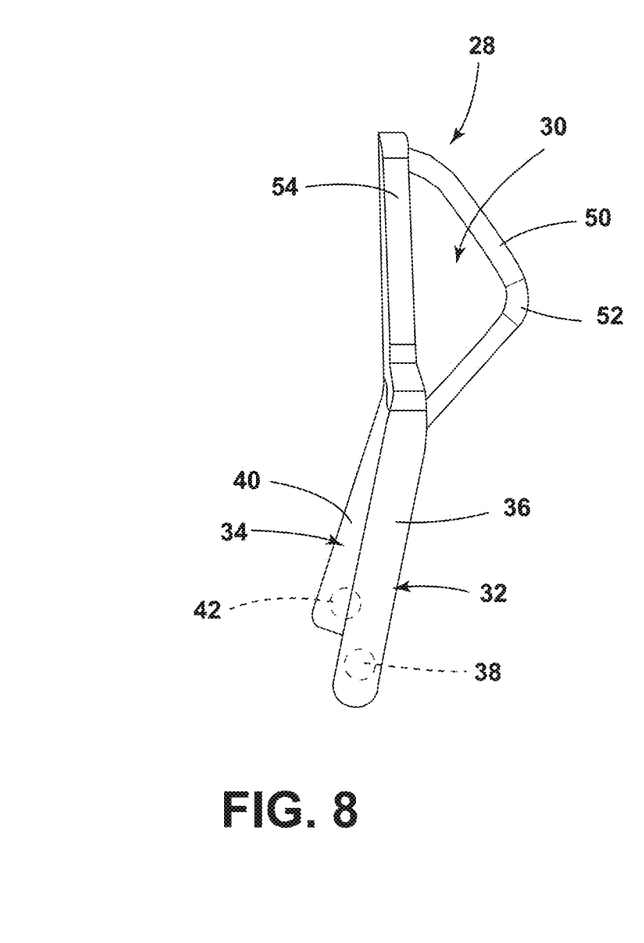
FIG. 8 is a side elevational view of the retention finger, illustrating the first portion, the first engagement feature, and the second engagement feature, according to one embodiment.

Referring now to FIGS. 1, 2, 7, and 8, the retention finger 28 includes the first engagement feature 32 and the second engagement feature 34. The first engagement feature 32 is coupled to the first portion 30 of the retention finger 28 and is configured to be pivotably engaged with the first bracing feature 20. The second engagement feature 34 is coupled to the first portion 30 of the retention finger 28 and is configured to be engaged with the second bracing feature 24. As illustrated in FIGS. 7 and 8, the first engagement feature 32 includes the first arm 36 and the first rod 38. The first arm 36 is coupled to the first portion 30 and extends away from the first portion 30 to the first rod 38 which extends outward from the first arm 36 along a length of the first rod 38 in a first direction. As illustrated in FIG. 7, the first engagement feature 32 includes two first arms 36 that are coupled to the first portion 30. The two first arms 36 of the first engagement feature 32 extend away from the first portion 30 generally parallel to each other, and the first rod 38 extends along the length of the first rod 38 in the first direction between the two first arms 36.

The second engagement feature 34 includes the second arm 40 and the second rod 42. The second arm 40 is coupled to the first portion 30 and extends away from the first portion 30 to the second rod 42. The second rod 42 extends outward from the second arm 40 along a length of the second rod 42 in a second direction that is substantially parallel to the first direction. As illustrated in FIG. 7, the lengths of the first and second rods 38, 42 are substantially parallel to each other. In the embodiment illustrated in FIG. 7, the second engagement feature 34 includes two second arms 40 that are coupled to the first portion 30 and that extend away from the first portion 30 generally parallel to each other. As illustrated, the second rod 42 extends between the two second arms 40 along the length of the second rod 42 in the second direction.

Referring now to FIGS. 7 and 8, in various implementations, the second rod 42 is nearer than the first rod 38 to the first portion 30 of the retention finger 28. For example, in the embodiment illustrated in FIGS. 7 and 8, the first arms 36 of the first engagement feature 32 extend a first distance from the first portion 30 to the first rod 38, and the second arms 40 of the second engagement feature 34 extend a second distance between the first portion 30 and the second rod 42, wherein the first distance is greater than the second distance. In the embodiment illustrated in FIG. 7, the length of the first rod 38 is greater than the length of the second rod 42. As illustrated in FIG. 8, in the at rest position of the first and second engagement features 32, 34, the first arm 36 of the first engagement feature 32 extends along a length of the first arm 36 in a first direction, and the second arm 40 of the second engagement feature 34 extends along a length of the second arm 40 in a second direction, wherein the first direction and the second direction are not parallel to each other. As illustrated in FIG. 8, the second arm 40 angles further rearwardly relative to the retention rim 54 than the first arm 36. As illustrated in FIGS. 7 and 8, the first portion 30, the first engagement feature 32, and the second engagement feature 34 are integrally coupled with each other, such that the retention finger 28 is a single unitary structure. As described further herein, the first rod 38 is configured to be received within the first arcuate receiving space 22 defined by the first bracing feature 20, and the second rod 42 is configured to be received within the second arcuate receiving space 26 defined by the second bracing feature 24.

Figure 9:
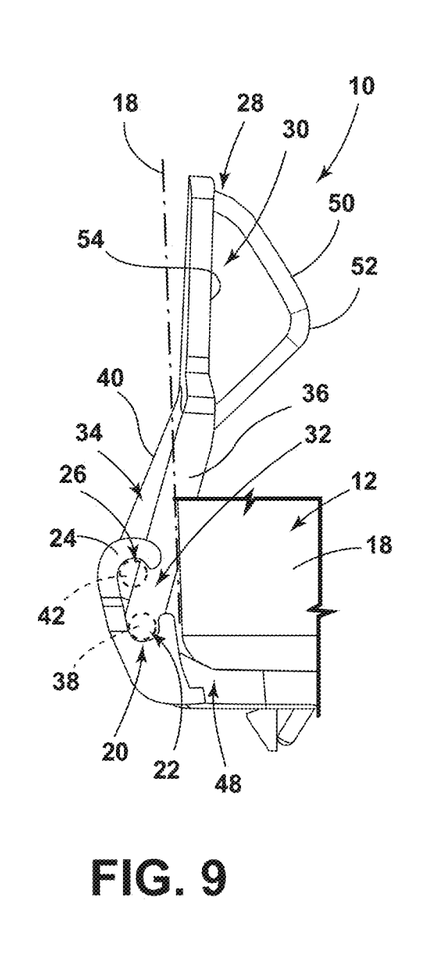
FIG. 9 is a partial side elevational view of a portion of the cup holder assembly, illustrating the retention finger in a home condition, according to one embodiment.
Figure 10:
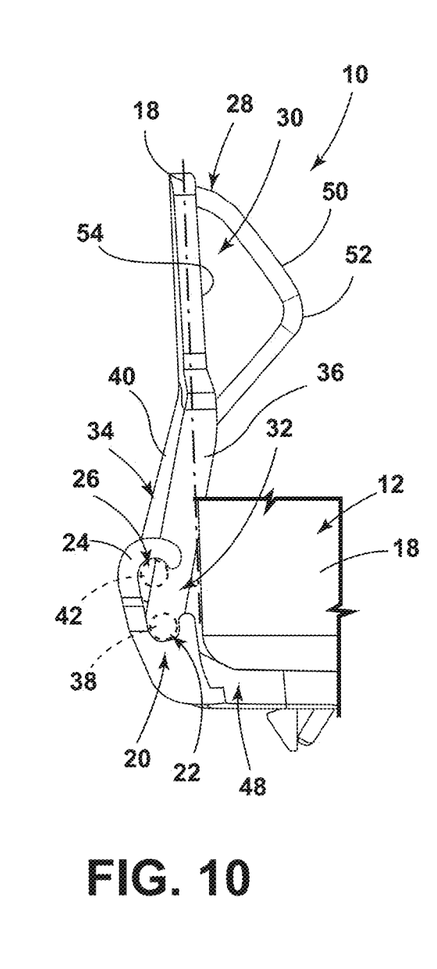
FIG. 10 is a partial side elevational view of a portion of the cup holder assembly, illustrating the retention finger in a first position, wherein the second engagement feature of the retention finger is elastically deformed a first amount, according to one embodiment.
Figure 11:
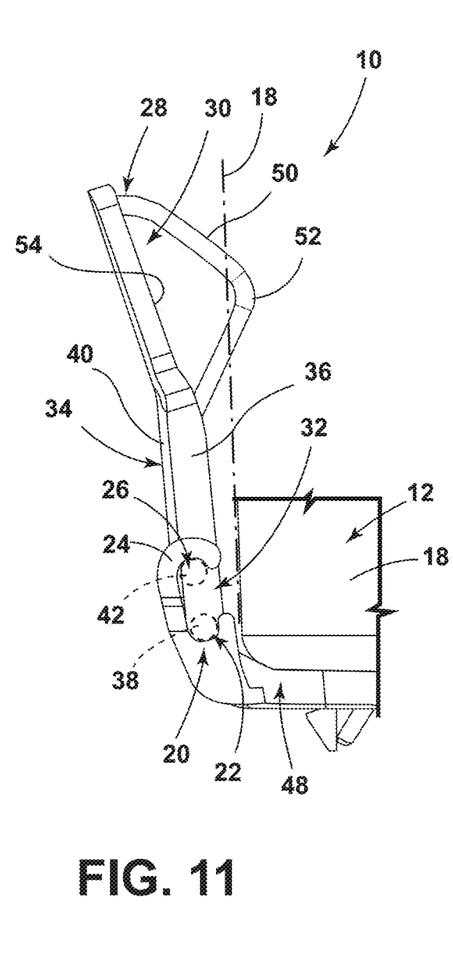
FIG. 11 is a partial side elevational view of a portion of the cup holder assembly, illustrating the retention finger in a second position, wherein the second engagement feature is elastically deformed a second amount, according to one embodiment.

Referring now to FIGS. 1, 2, and 9-11, in various embodiments, the retention finger 28 is operable to pivot about a pivot axis 58 that is wholly outside of the cup-receiving cavity 14, as illustrated in FIG. 1, between a first position and a second position. In the first position, the retention finger 28 extends into the cup-receiving cavity 14 a first distance and is elastically deformed a first amount, as illustrated in FIG. 10. In the second position, the retention finger 28 extends into the cup-receiving cavity 14 a second distance that is less than the first distance and the retention finger 28 is elastically deformed a second amount that is greater than the first amount, as illustrated in FIG. 11. In various embodiments, in the second position of the retention finger 28, the elastic deformation of the retention finger 28 biases the retention finger 28 toward the first position. Further, in the first position of the retention finger 28, the elastic deformation of the retention finger 28 biases the retention finger 28 away from the second position.

Referring now to FIGS. 9-11, in various embodiments, the retention finger 28 is biased toward the first position and/or away from the second position due to elastic deformation of the retention finger 28 from a home condition wherein the retention finger 28 is not elastically deformed. The retention finger 28 is shown in the home condition in FIG. 9. As illustrated in FIG. 9, the first and second rods 38, 42 of the first and second engagement features 32, 34, respectively, are engaged with the first and second arcuate receiving spaces 22, 26 defined by the first and second bracing features 20, 24, respectively. As illustrated, with zero elastic deformation of the retention finger 28, the first portion 30 and the retention rim 54 extending outward from the first portion 30 would both extend beyond the side wall 18 of the body 12 and into the cup-receiving cavity 14. In practice, contact between the retention rim 54 and the side wall 18 of the body 12 adjacent to the aperture 16 would generally prevent the retention rim 54 from extending into the cup-receiving cavity 14 as illustrated in FIG. 9. As such, during assembly of the retention finger 28 with the body 12, the second engagement feature 34 deforms to allow the first and second rods 38, 42 to be received within the first and second arcuate receiving spaces 22, 26 while the retention rim 54 remains outside of the cup-receiving cavity 14, as illustrated in FIG. 10, wherein the retention finger 28 is in the first position. As shown in FIG. 10, the second engagement feature 34 is elastically deformed relative to the home condition, shown in FIG. 9, such that the second rod 42 is nearer to the first rod 38, and the second arm 40 is closer to parallel with the first arm 36. This elastic deformation of the second engagement feature 34 causes the retention rim 54 to be biased against the side wall 18, as the second engagement feature 34 is urged to resiliently return to the home condition, but is constrained by the second bracing feature 24.

Movement of the retention finger 28 from the first position to the second position causes further elastic deformation of the second engagement feature 34 relative to the home condition, as illustrated in FIG. 11. In operation, as a cup enters the cup-receiving cavity 14 and applies a force to the first portion 30 in an outward direction, the first rod 38 of the first engagement feature 32 rotates within the first arcuate receiving space 22 defined by the first bracing feature 20, and the second engagement feature 34 is elastically deformed to allow the first portion 30 to move outward as the retention finger 28 moves from the first position, as illustrated in FIG. 10, to the second position, as illustrated in FIG. 11. The additional deformation of the second engagement feature 34 away from the home condition in the second position of the retention finger 28 causes the retention finger 28 to be biased back toward the first position, as illustrated in FIG. 10. Accordingly, when the cup is removed from the cup-receiving cavity 14, the retention finger 28 resiliently rebounds back to the first position.

In an exemplary embodiment of the cup holder assembly 10, the cup holder assembly 10 includes the body 12 that defines the cup-receiving cavity 14 and the aperture 16 that extends through the side wall 18 of the body 12. The first bracing feature 20 is coupled to the body 12 and defines the first arcuate receiving space 22. The second bracing feature 24 is coupled to the body 12 and defines the second arcuate receiving space 26. The retention finger 28 includes the first portion 30 that extends into the cup-receiving cavity 14 through the aperture 16, and the first and second engagement features 32, 34. The first engagement feature 32 includes two first arms 36 that are coupled to the first portion 30, and the first rod 38 that extends between the two first arms 36. The first rod 38 is received within the first arcuate receiving space 22 defined by the first bracing feature 20, such that the first engagement feature 32 is pivotably engaged with the first bracing feature 20. The second engagement feature 34 includes two second arms 40 that are coupled to the first portion 30, and the second rod 42 that extends between the two second arms 40. The second rod 42 is received within the second arcuate receiving space 26 defined by the second bracing feature 24, such that the second rod 42 is engaged with the second bracing feature 24.

In operation of the exemplary embodiment, the retention finger 28 is operable to move via pivotal movement of the first engagement feature 32 relative to the first bracing feature 20 between a first position and a second position. In the first position, the first portion 30 extends into the cup-receiving cavity 14 a first distance and the second engagement feature 34 is elastically deformed a first amount due to contact between the second rod 42 and the second bracing feature 24. In the second position, the first portion 30 extends into the cup-receiving cavity 14 a second distance that is less than the first distance and the second engagement feature 34 is elastically deformed a second amount that is greater than the first amount due to contact between the second rod 42 and the second bracing feature 24.

The cup holder assembly 10 of the present disclosure may provide a variety of advantages. First, the design of the retention finger 28 and the first and second bracing features 20, 24 allows the retention finger 28 to be biased toward the cup-receiving cavity 14 via elastic deformation of the retention finger 28 without the use of additional biasing features, such as a spring or elastic band. Second, the first and second bracing features 20, 24 being integrally coupled with the body 12 may reduce the number of components in the cup holder assembly 10, which can reduce assembly complexity.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A cup holder assembly, comprising:
   a body that defines a cup-receiving cavity and an aperture that extends through a side wall of the body;
   a first bracing feature coupled to the body and positioned outside of the cup-receiving cavity;
   a second bracing feature coupled to the body and positioned outside of the cup-receiving cavity; and
   a retention finger, comprising:
      a first portion that extends into the cup-receiving cavity through the aperture;
      a first engagement feature coupled to the first portion and pivotably engaged with the first bracing feature; and
      a second engagement feature coupled to the first portion and engaged with the second bracing feature;
   wherein the first portion, the first engagement feature, and the second engagement feature are integrally formed as a single unitary body, and wherein the retention finger is operable to move via pivotal movement of the first engagement feature relative to the first bracing feature between a first position, wherein the first portion extends into the cup-receiving cavity a first distance and the second engagement feature is elastically deformed a first amount due to contact with the second bracing feature, and a second position, wherein the first portion extends into the cup-receiving cavity a second distance that is less than the first distance and the second engagement feature is elastically deformed a second amount that is greater than the first amount due to contact with the second bracing feature.

2. The cup holder assembly of claim 1, wherein the first bracing feature defines a first arcuate receiving space, and the second bracing feature defines a second arcuate receiving space, wherein the second arcuate receiving space is nearer than the first arcuate receiving space to the aperture that extends through the side wall of the body.

3. The cup holder assembly of claim 2, wherein the first engagement feature comprises:
   a first arm coupled to the first portion and extending away from the first portion; and
   a first rod extending outward from the first arm along a length of the first rod in a first direction.

4. The cup holder assembly of claim 3, wherein the second engagement feature comprises:
   a second arm coupled to the first portion and extending away from the first portion; and
   a second rod extending outward from the second arm along a length of the second rod in a second direction that is substantially parallel to the first direction, such that the lengths of the first and second rods are substantially parallel to each other.

5. The cup holder assembly of claim 4, wherein the second rod is nearer than the first rod to the first portion of the retention finger.

6. The cup holder assembly of claim 4, wherein the first rod is received within the first arcuate receiving space defined by the first bracing feature, and the second rod is received within the second arcuate receiving space defined by the second bracing feature.

7. The cup holder assembly of claim 1, wherein the first and second bracing features are integrally coupled with the body.

8. The cup holder assembly of claim 1, wherein at least one of the first bracing feature and the second bracing feature is integrally coupled with a bracket that is removably coupled to the body.

9. The cup holder assembly of claim 1, wherein, in the second position of the retention finger, the retention finger is biased towards the first position due to the elastic deformation of the second engagement feature.

10. A cup holder assembly, comprising:
- a body that defines a cup-receiving cavity and an aperture that extends through a side wall of the body;
- a first bracing feature coupled to the body, positioned outside of the cup-receiving cavity, and defining a first arcuate receiving space;
- a second bracing feature coupled to the body, positioned outside of the cup-receiving cavity, and defining a second arcuate receiving space; and
- a retention finger, comprising:
  - a first portion that extends into the cup-receiving cavity through the aperture;
  - a first engagement feature that includes a first arm coupled to the first portion and a first rod extending outward from the first arm along a length of the first rod in a first direction, the first rod being received within the first arcuate receiving space defined by the first bracing feature, such that the first engagement feature is pivotably engaged with the first bracing feature; and
  - a second engagement feature that includes a second arm coupled to the first portion and a second rod extending outward from the second arm along a length of the second rod in a second direction that is substantially parallel to the first direction, such that the lengths of the first and second rods are substantially parallel to each other, the second rod being received within the second arcuate receiving space defined by the second bracing feature, such that the second rod is engaged with the second bracing feature;
- wherein the retention finger is operable to move via pivotal movement of the first engagement feature relative to the first bracing feature between a first position, wherein the first portion extends into the cup-receiving cavity a first distance and the second engagement feature is elastically deformed a first amount due to contact between the second rod and the second bracing feature, and a second position, wherein the first portion extends into the cup-receiving cavity a second distance that is less than the first distance and the second engagement feature is elastically deformed a second amount that is greater than the first amount due to contact between the second rod and the second bracing feature.

11. The cup holder assembly of claim 10, wherein the second arcuate receiving space is nearer than the first arcuate receiving space to the aperture that extends through the side wall of the body.

12. The cup holder assembly of claim 10, wherein the second rod is nearer than the first rod to the first portion of the retention finger.

13. The cup holder assembly of claim 10, wherein the first and second bracing features are integrally coupled with the body.

14. The cup holder assembly of claim 10, wherein at least one of the first bracing feature and the second bracing feature is integrally coupled with a bracket that is removably coupled to the body.

15. The cup holder assembly of claim 10, wherein the first portion, the first engagement feature, and the second engagement feature are integrally coupled.

16. A cup holder assembly, comprising:
- a body that defines a cup-receiving cavity and an aperture that extends through a side wall of the body; and
- a retention finger consisting essentially of a single unitary structure and being operable to pivot about a pivot axis that is wholly outside of the cup-receiving cavity between a first position, wherein the retention finger extends into the cup-receiving cavity a first distance and is elastically deformed a first amount, and a second position, wherein the retention finger extends into the cup-receiving cavity a second distance that is less than the first distance and the retention finger is elastically deformed a second amount that is greater than the first amount.

17. The cup holder assembly of claim 16, wherein, in the second position of the retention finger, the elastic deformation of the retention finger biases the retention finger toward the first position.

18. The cup holder assembly of claim 16, wherein, in the first position of the retention finger, the elastic deformation of the retention finger biases the retention finger away from the second position.

19. The cup holder assembly of claim 16, wherein the single unitary structure of the retention finger comprises:
- a first portion that extends into the cup-receiving cavity through the aperture;
- a first engagement feature coupled to the first portion and pivotably engaged with a first bracing feature; and
- a second engagement feature coupled to the first portion and engaged with a second bracing feature.

\* \* \* \* \*